(12) United States Patent
Ideguchi (10) Patent No.: US 9,926,013 B2
(45) Date of Patent: Mar. 27, 2018

(54) AUTOMOBILE VEHICLE BODY STRUCTURE

(71) Applicant: HONDA MOTOR CO., LTD., Minato-Ku, Tokyo (JP)

(72) Inventor: Takahiro Ideguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/915,583

(22) PCT Filed: Aug. 27, 2014

(86) PCT No.: PCT/JP2014/072434
§ 371 (c)(1),
(2) Date: Feb. 29, 2016

(87) PCT Pub. No.: WO2015/033836
PCT Pub. Date: Mar. 12, 2015

(65) Prior Publication Data
US 2016/0214650 A1    Jul. 28, 2016

(30) Foreign Application Priority Data

Sep. 4, 2013   (JP) .................................. 2013-183204
Sep. 10, 2013  (JP) .................................. 2013-187074

(51) Int. Cl.
*B62D 21/15*   (2006.01)
*B62D 1/16*    (2006.01)
(Continued)

(52) U.S. Cl.
CPC ............. *B62D 21/155* (2013.01); *B62D 1/16* (2013.01); *B62D 25/14* (2013.01); *B62D 25/145* (2013.01);
(Continued)

(58) Field of Classification Search
CPC .. B62D 21/155; B62D 29/043; B62D 29/005; B62D 25/14; B62D 25/2045; B62D 25/145; B62D 1/16
(Continued)

(56) References Cited

U.S. PATENT DOCUMENTS 6,450,533 B1 *  9/2002  Kimura ................ B62D 25/145
                                                              180/90
6,817,382 B2    11/2004  Tanaka et al.
(Continued)

FOREIGN PATENT DOCUMENTS

EP   0 479 630 A1   4/1992
EP   0 673 829 A2   9/1995
(Continued)

*Primary Examiner* — Joseph D. Pape
*Assistant Examiner* — Dana D Ivey
(74) *Attorney, Agent, or Firm* — Carrier Blakman & Associates, P.C.; Joseph P. Carrier; Jingli Wang (57) ABSTRACT

In an automobile vehicle body structure, a steering hanger is formed from a metal pipe on one side in a vehicle width direction and a carbon fiber-reinforced plastic (CFRP) pipe on the other side in the vehicle width direction, and a steering column is supported on the metal pipe, for ensuring the strength with which the steering column is supported while minimizing any increase in the weight of the steering hanger. The metal pipe is connected to a CFRP linking member connecting an upper part of a dash panel lower and a center tunnel. The collision load of a frontal collision input is transmitted into the dash panel lower to the high strength center tunnel for preventing the dash panel lower from collapsing to the rear while minimizing any increase in the weight, and for enhancing the stiffness of the steering hanger to prevent vibration of the steering column.

10 Claims, 8 Drawing Sheets

(51) Int. Cl.
    *B62D 25/14*     (2006.01)
    *B62D 25/20*     (2006.01)
    *B62D 29/00*     (2006.01)
    *B62D 29/04*     (2006.01)

(52) U.S. Cl.
    CPC ....... *B62D 25/2045* (2013.01); *B62D 29/005* (2013.01); *B62D 29/043* (2013.01)

(58) Field of Classification Search
    USPC .................................................. 296/187.09
    See application file for complete search history.

(56) References Cited

U.S. PATENT DOCUMENTS

| | | |
|---|---|---|
| 7,658,439 B2 | 2/2010 | Meier |
| 7,896,396 B2 * | 3/2011 | Braun .................... B62D 25/14 280/779 |
| 8,764,102 B2 | 7/2014 | Abe et al. |
| 2008/0054680 A1 | 3/2008 | Ellison et al. |

FOREIGN PATENT DOCUMENTS

| | | |
|---|---|---|
| FR | 2933368 A1 | 1/2010 |
| JP | H09-118252 A | 5/1997 |
| JP | 2003-205311 A | 7/2003 |
| JP | 2004-168289 A | 6/2004 |
| JP | 2008-127010 A | 6/2008 |
| JP | 2008-284961 A | 11/2008 |
| JP | 2009-262703 A | 11/2009 |
| JP | 4556320 B2 | 10/2010 |
| JP | 4779880 B2 | 9/2011 |
| WO | 2010/058832 A1 | 5/2010 |

* cited by examiner

AUTOMOBILE VEHICLE BODY STRUCTURE

TECHNICAL FIELD

The present invention relates to an automobile vehicle body structure in which a steering hanger for supporting a steering column is formed from a metal pipe on one side in a vehicle width direction and a CFRP pipe on the other side in the vehicle width direction, and a steering hanger main body for supporting the steering column is formed from a CFRP pipe material.

BACKGROUND ART

An arrangement in which vehicle body stiffness is enhanced by connecting, by means of a tunnel top reinforcement disposed in the fore-and-aft direction along an upper face of a center tunnel, a dash cross member that is disposed in the vehicle width direction along the upper end of a dash panel lower and connects rear ends of left and right front side frames, and a rear cross member that is disposed in the vehicle width direction in a vehicle body rear part is known from Patent Document 1 below.

Furthermore, an arrangement in which a steering hanger that is disposed in the vehicle width direction to the rear of a dash panel lower and supports a steering column is reinforced by connecting it to the upper end of a stay member rising from a tunnel reinforcement that reinforces a center tunnel is known from Patent Document 2 below.

Moreover, an arrangement in which an inner framework member is disposed between a front panel and a rear panel forming a dash panel lower connected to the front end of a center tunnel and the front ends of left and right front pillar lowers, and a collision load input from a front side frame into the dash panel lower is absorbed by transmitting it to the center tunnel and the left and right front pillar lowers is known from Patent Document 3 below.

Furthermore, an arrangement in which a cross member (steering hanger) disposed along the vehicle width direction on the reverse face side of an instrument panel of an automobile is formed from a pipe-shaped base frame made of a fiber-reinforced resin and a pipe-shaped reinforcing frame made of a fiber-reinforced resin covering the outer periphery on one end side, in the vehicle width direction, of the base frame, and a bracket for fixing a vehicle body and a bracket for supporting a column shaft (steering column) are formed integrally with the reinforcing frame using a fiber-reinforced resin is known from Patent Document 4 below.

RELATED ART DOCUMENTS

Patent Documents

Patent Document 1: Japanese Patent Application Laid-open No. 9-118252
Patent Document 2: Japanese Patent No. 4556320
Patent Document 3: Japanese Patent No. 4779880
Patent Document 4: Japanese Patent Application Laid-open No. 2004-168289

SUMMARY OF THE INVENTION

Problems to be Solved by the Invention

When the collision load of a frontal collision is input into a dash panel lower, the dash panel lower collapses to the rear with a part connected to a floor panel as a fulcrum, and there is a possibility that the vehicle compartment space will be narrowed. In order to prevent this from happening, the strength of the dash panel lower toward the collision load of a frontal collision may be enhanced, but if the strength is enhanced by merely reinforcing the dash panel lower, there is the problem that a sufficient reinforcement effect cannot be obtained despite the weight being increased.

Furthermore, since the steering hanger is a long member having opposite ends supported by left and right front pillar lowers, it easily vibrates, and since the stiffness of a steering hanger made of a fiber-reinforced resin in particular is low compared with one made of a metal, a steering column or a steering wheel supported thereon vibrates, and there is a possibility that the driver will experience an unpleasant sensation. In order to prevent this from happening, the steering hanger, made of a fiber-reinforced resin, may be subjected to sufficient reinforcement, but by so doing the weight of the steering hanger increases, and there is the problem that the benefit of the steering hanger being made of a fiber-reinforced resin cannot be exploited fully.

The present invention has been accomplished in light of the above circumstances, and it is an object thereof to reinforce effectively a dash panel lower by utilizing an existing steering hanger, enhance the stiffness of the steering hanger itself, and achieve a balance between lightening of the weight of the steering hanger and prevention of vibration of a steering column.

Means for Solving the Problems

In order to attain the above object, according to a first aspect of the present invention, there is provided an automobile vehicle body structure in which a steering hanger that is disposed in a vehicle width direction in a front part of a vehicle body of an automobile and supports a steering column, and a center tunnel of a floor panel are connected by a linking member made of a CFRP, wherein the linking member is a closed cross-section member whose cross section reduces toward a lower portion thereof, and a bulkhead is disposed within the lower portion.

Further, according to a second aspect of the present invention, in addition to the first aspect, the lower portion of the linking member is connected to a side wall of the center tunnel.

Furthermore, according to a third aspect of the present invention, in addition to the first or second aspect, the linking member is formed by joining a pair of CFRP sheets having a squared U-shaped cross section so as to have a hollow closed cross-section, and the pair of CFRP sheets integrally have mounting seating faces that overlap each other as a solid plate in a part connected to the center tunnel.

Moreover, according to a fourth aspect of the present invention, in addition to the first, second or third aspect, the linking member is formed by joining the pair of CFRP sheets having a squared U-shaped cross section so as to have a hollow closed cross-section, and integrally comprises a mounting seating face in a part connected to a steering hanger main body of the steering hanger.

Further, according to a fifth aspect of the present invention, in addition to the first, second, third or fourth aspect, the steering hanger is formed from a metal pipe on one side in the vehicle width direction and a CFRP pipe on the other side in the vehicle width direction, the steering column is supported on the metal pipe, and the metal pipe is connected to an intermediate part of a CFRP linking member connecting an upper part of a dash panel lower and the center tunnel.

Furthermore, according to a sixth aspect of the present invention, in addition to the fifth aspect, the linking member comprises a first linking member extending from the dash panel lower to the metal pipe and a second linking member extending from the metal pipe to the center tunnel, and axes of the first and second linking members intersect an axis of the metal pipe.

Moreover, according to a seventh aspect of the present invention, in addition to the sixth aspect, the first and second linking members are formed by joining a pair of CFRP sheets having a squared U-shaped cross section so as to have a hollow closed cross-section, and integrally comprise a mounting seating face on opposite end parts thereof.

Further, according to an eighth aspect of the present invention, in addition to the first, second, third or fourth aspect, the steering hanger supporting the steering column comprises a steering hanger main body that is formed from a CFRP pipe material and a steering column support part that is provided on the steering hanger main body and supports the steering column, and the steering column support part comprises an aluminum pipe material that is fitted onto an outer periphery of the steering hanger main body and an aluminum extrusion that connects the aluminum pipe material to the steering column.

Furthermore, according to a ninth aspect of the present invention, in addition to the eighth aspect, the aluminum extrusion is a member having a truss structure when viewed in an axial direction of the steering hanger main body, the aluminum pipe material is connected to a first apex of one triangle of the truss structure, and first and second fixed portions are provided at a second apex and a third apex, the steering column being fixed to the first and second fixed portions.

Moreover, according to a tenth aspect of the present invention, in addition to the ninth aspect, the aluminum extrusion comprises a third fixed portion fixed to a dash panel lower, and the first and second fixed portions and the third fixed portion are disposed on a straight line extending in a fore-and-aft direction.

A first linking member 24 and a second linking member 30 of a first embodiment, which is described later, correspond to the linking member of the present invention, a first CFRP sheet 25 and a second CFRP sheet 26 of the first embodiment correspond to the CFRP sheet of the present invention, and a first CFRP sheet 31 and a second CFRP sheet 32 of the first embodiment correspond to the CFRP sheet of the present invention.

Effects of the Invention

In accordance with the first aspect of the present invention, since the linking member extending from the metal pipe to the center tunnel is a closed cross-section member whose cross section reduces toward the lower portion, it is possible to ensure a wide space for the feet of an occupant while achieving a balance between light weight and strength of the linking member and, moreover, since the bulkhead is disposed within the lower portion, it is possible, by supplementing the strength of the reduced cross section lower portion by means of the bulkhead, to make the strength of each part of the linking member uniform.

Furthermore, in accordance with the second aspect of the present invention, since the lower portion of the second linking member is connected to the side wall of the center tunnel, it is possible, by supporting the rearward collision load input into the steering hanger due to a frontal collision with a shear load of the linking member, to enhance the strength with which the steering hanger is supported.

Moreover, in accordance with the third aspect of the present invention, since the linking member is formed so as to have a hollow closed cross-section by joining the pair of CFRP sheets having a squared U-shaped cross section, and the pair of CFRP sheets integrally include the mounting seating faces that overlap each other as a solid plate in a part connected to the center tunnel, the linking member is a lightweight and high strength member and, moreover, the strength with which it is joined to the center tunnel is enhanced.

Furthermore, in accordance with the fourth aspect of the present invention, since the linking member is formed so as to have a hollow closed cross-section by joining the pair of CFRP sheets having a squared U-shaped cross section and integrally includes a mounting seating face on a part connected to the steering hanger main body, the linking member becomes a lightweight and high strength member, and the strength with which it is joined to the steering hanger main body is enhanced.

Moreover, in accordance with the fifth aspect of the present invention, since the steering hanger is formed from the metal pipe on one side in the vehicle width direction and the CFRP pipe on the other side in the vehicle width direction, and the steering column is supported on the metal pipe, compared with a case in which the entire steering hanger is formed from a metal, it is possible to ensure the strength with which the steering column is supported while minimizing any increase in the weight. Furthermore, since the metal pipe is connected to the intermediate part of the CFRP linking member connecting the upper part of the dash panel lower and the center tunnel, it is possible, by transmitting the collision load of a frontal collision input into the dash panel lower to the high strength center tunnel via the linking member, to prevent the dash panel lower from collapsing to the rear while minimizing any increase in the weight, and it is also possible by enhancing the stiffness of the steering hanger to prevent vibration of the steering column Furthermore, in accordance with the sixth aspect of the present invention, since the linking member includes the first linking member extending from the dash panel lower to the metal pipe and the second linking member extending from the metal pipe to the center tunnel, and the axes of the first and second linking members intersect the axis of the metal pipe, it is possible to efficiently transmit a rearward collision load, input into the dash panel lower, to the center tunnel via the first linking member, the metal pipe, and the second linking member.

Moreover, in accordance with the seventh aspect of the present invention, since the first and second linking members are formed so as to have a hollow closed cross-section by joining the pair of CFRP sheets having a squared U-shaped cross section and integrally include a mounting seating face on opposite end parts thereof, not only are the first and second linking members lightweight and high strength members, but the strength with which the first and second linking members are joined to the dash panel lower, the center tunnel, and the metal pipe is also enhanced.

Furthermore, in accordance with the eighth aspect of the present invention, the steering hanger disposed in the vehicle width direction in the front part of the vehicle body of the automobile and supporting the steering column includes the steering hanger main body formed from a CFRP pipe material and the steering column support part provided on the steering hanger main body and supporting the steering column. Since the steering column support part is formed from the aluminum pipe material fitted around the outer periphery of the steering hanger main body and the aluminum extrusion connecting the aluminum pipe material to the steering column, compared with a case in which both the steering hanger main body and the steering column support part are made of a CFRP, although the weight increases slightly, vibration of the steering column is suppressed due to the steering column support part being made of high stiffness aluminum, and as a result it is possible to achieve a balance between lightening of the weight of the steering hanger and prevention of vibration of the steering column.

Moreover, in accordance with the ninth aspect of the present invention, since the aluminum extrusion is a member having a truss structure when viewed in the axial direction of the steering hanger main body, the aluminum pipe material is connected to the first apex of one triangle of the truss structure, and the first and second fixed portions, to which the steering column is fixed, are provided at the second apex and the third apex, the stiffness of the aluminum extrusion is enhanced, and the steering hanger main body and the steering column are strongly connected via the aluminum extrusion, thus reducing vibration of the steering column more effectively.

Furthermore, in accordance with the tenth aspect of the present invention, since the aluminum extrusion includes the third fixed portion fixed to the dash panel lower, and the first and second fixed portions and the third fixed portion are disposed on a straight line extending in the fore-and-aft direction, the stiffness of the aluminum extrusion is enhanced, and the dash panel lower and the steering column are strongly connected via the aluminum extrusion, thus reducing vibration of the steering column more effectively.

EXPLANATION OF REFERENCE NUMERALS AND SYMBOLS

12 Floor panel
15 Dash panel lower
16 Center tunnel
16a Center tunnel side wall
21 Steering hanger
22 Metal pipe
23 CFRP pipe
24 First linking member (linking member)
25 First CFRP sheet (CFRP sheet)
26 Second CFRP sheet (CFRP sheet)
27 Mounting seating face
29 Mounting seating face
30 Second linking member (linking member)
30a Second linking member lower portion
31 First CFRP sheet (CFRP sheet)
32 Second CFRP sheet (CFRP sheet)
33 Mounting seating face
34 Mounting seating face
36 Bulkhead
L1 Axis of first linking member
L2 Axis of second linking member
L3 Axis of metal pipe
112 Floor panel
115 Dash panel lower
116 Center tunnel
116a Center tunnel side wall
118 Steering column
119 Steering hanger
121 Steering hanger main body
122 Steering column support part
123 Aluminum pipe material
124 First aluminum extrusion (aluminum extrusion)
124a First fixed portion
124b Second fixed portion
125 Second aluminum extrusion (aluminum extrusion)
125a First fixed portion
125b Second fixed portion
125c Third fixed portion
132 Linking member
132a Lower portion
133 First CFRP sheet (CFRP sheet)
134 Second CFRP sheet (CFRP sheet)
135 Mounting seating face
136 Mounting seating face
138 Bulkhead
L Straight line
a First apex
b Second apex
c Third apex

MODES FOR CARRYING OUT THE INVENTION

A first embodiment of the present invention is explained below by reference to FIG. 1 to FIG. 3.
First Embodiment In the present specification, the fore-and-aft direction, the left-and-right direction (vehicle width direction), and the vertical direction are defined with reference to an occupant seated on a driving seat.

Figure 1:
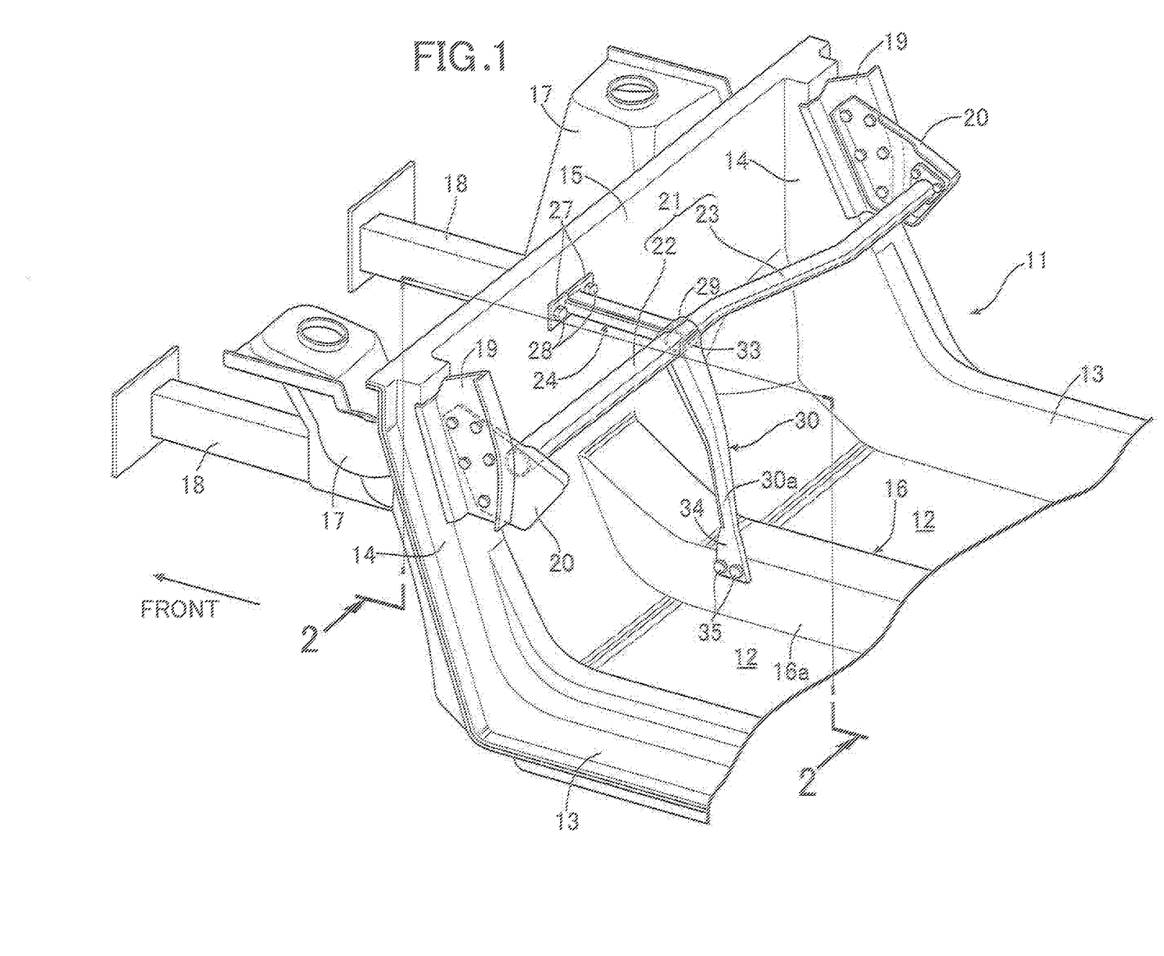
FIG. 1 is a perspective view of a front part of a vehicle body of an automobile. (first embodiment)

As shown in FIG. 1, a cabin 11 formed into a bathtub shape using a CFRP (carbon fiber-reinforced plastic) includes a pair of left and right side sills 13 and 13 extending in the fore-and-aft direction along left and right side parts of a floor panel 12, a pair of left and right front pillar lowers 14 and 14 rising from front ends of the left and right side sills 13 and 13, a dash panel lower 15 rising from the front end of the floor panel 12 and providing a connection between front ends of the left and right front pillar lowers 14 and 14, and a center tunnel 16 extending from a rear face of the dash panel lower 15 to the rear in a middle part in the vehicle width direction of the floor panel 12. A pair of left and right damper housings 17 and 17, cast from aluminum, are fixed to a front face of the dash panel lower 15, and a pair of left and right front side frames 18 and 18 formed integrally with the damper housings 17 and 17 extend forward.

Second mounting brackets 20 and 20, pressed from a steel sheet, are fixed to first mounting brackets 19 and 19, cast from aluminum, fixed to upper rear faces of the left and right front pillar lowers 14 and 14, and a steering hanger 21 is provided so as to bridge between the left and right second mounting brackets 20 and 20 in the vehicle width direction. The steering hanger 21 is formed from a metal pipe 22 having its left end fixed to the left second mounting bracket 20, and a CFRP pipe 23 having its right end fixed to the right second mounting bracket 20, the outer periphery of the left end of the CFRP pipe 23 being fitted into and integrally joined to the inner periphery of the right end of the metal pipe 22. Supported on the metal pipe 22 of the steering hanger 21 is an intermediate part of a steering column, which is not illustrated.

Figure 2:
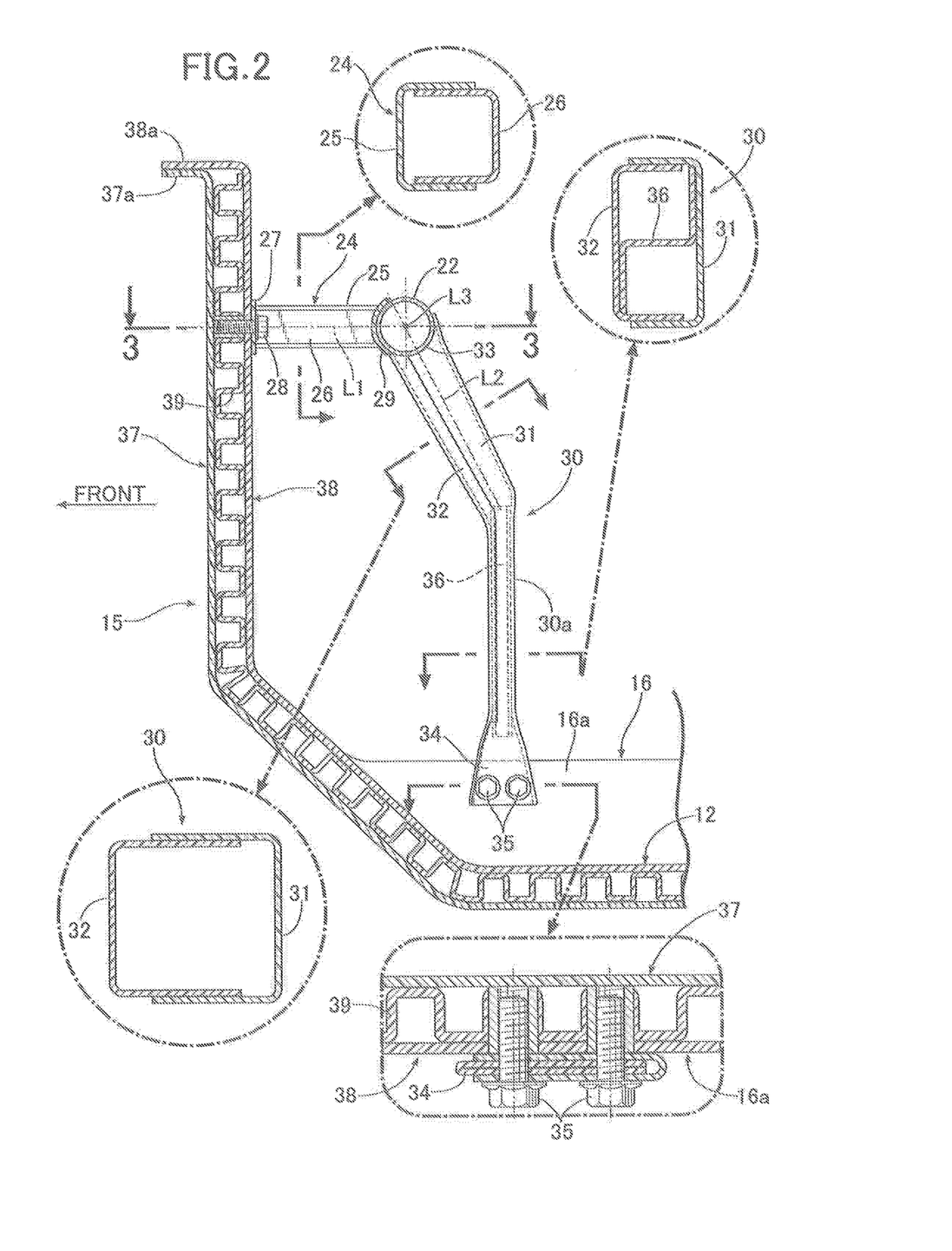
FIG. 2 is a sectional view along line 2-2 in FIG. 1. (first embodiment)
Figure 3:
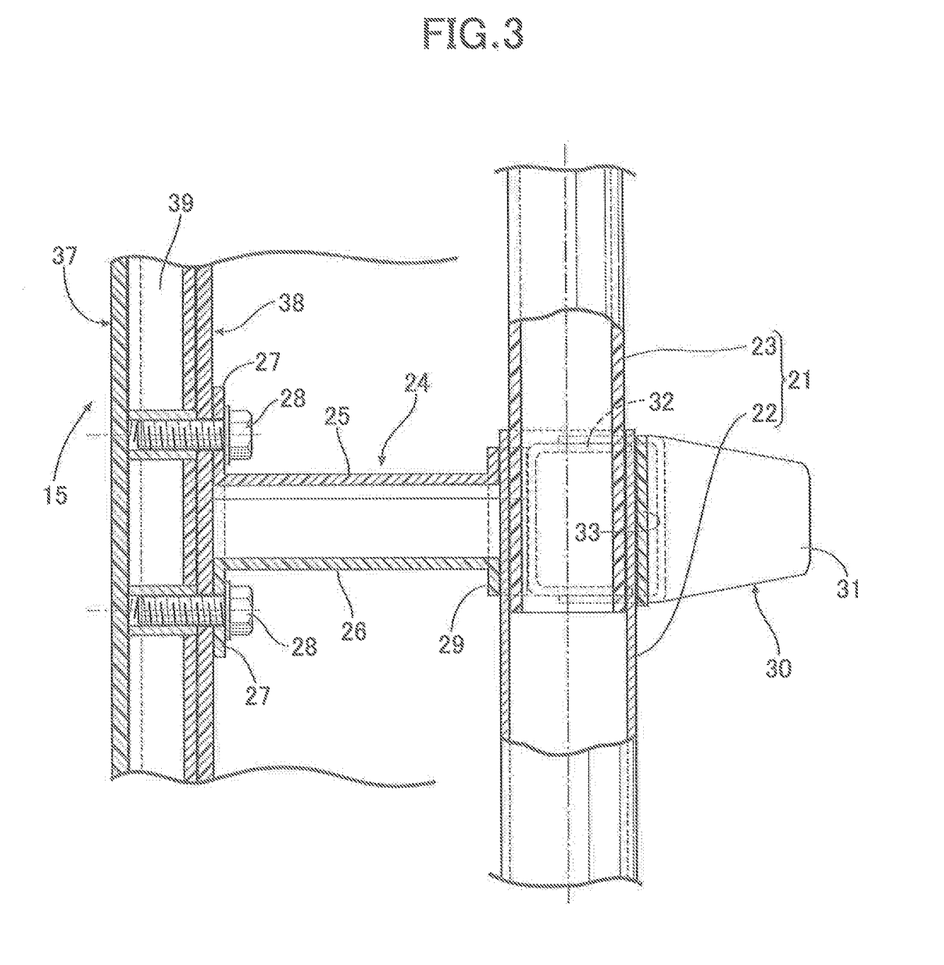
FIG. 3 is a sectional view along line 3-3 in FIG. 2. (first embodiment)

As shown in FIG. 2 and FIG. 3, the dash panel lower 15 and the floor panel 12 are formed integrally by joining an outer skin 37 positioned outside the vehicle body and an inner skin 38 positioned inside the vehicle body via joining flanges 37a and 38a, and a corrugated core material 39 sandwiched between the outer skin 37 and the inner skin 38 is disposed in the interiors of the dash panel lower 15 and the floor panel 12.

The rear face of the dash panel lower 15 and a front face of the metal pipe 22 of the steering hanger 21 are linked by a first linking member 24, made of a CFRP, extending in the fore-and-aft direction. The first linking member 24 has a constant cross section having a rectangular shape in the longitudinal direction, is formed so as to have a hollow closed cross-section by joining a first CFRP sheet 25 having a squared U-shaped cross section and a second CFRP sheet 26 having a squared U-shaped cross section, a flat plate-shaped mounting seating face 27 formed integrally with the front end of the first linking member 24 is fixed to the rear face of the dash panel lower 15 via bolts 28 and 28, and a partially cylindrical mounting seating face 29 formed integrally with the rear end thereof is fixed to the front face of the metal pipe 22 by bonding.

The upper end of a second linking member 30 rising upward to the front from a left side wall 16a of the center tunnel 16, which has an inverted U-shaped cross section, is connected to a lower face of the metal pipe 22. With regard to the second linking member 30, the cross section reduces from its upper end, which is connected to the metal pipe 22, toward its lower end, which is connected to the center tunnel 16. The second linking member 30 is formed so as to have a hollow closed cross-section by joining a first CFRP sheet 31 having a squared U-shaped cross section and a second CFRP sheet 32 having a squared U-shaped cross section, a partially cylindrical mounting seating face 33 formed integrally with the upper end of the second linking member 30 is fixed to the lower face of the metal pipe 22 by bonding, and a mounting seating face 34 formed integrally with the lower end thereof is fixed to the left side wall 16a of the center tunnel 16 via bolts 35 and 35.

With regard to the second linking member 30, its width in the vehicle width direction decreases toward the lower end and becomes a flat plate-shaped solid cross section at the mounting seating face 34. Disposed in a lower portion 30a of the second linking member 30 connected to an upper part of the mounting seating face 34 is a Z-shaped cross section bulkhead 36 connecting inner faces of the first CFRP sheet 31 and the second CFRP sheet 32.

Therefore, when viewed in the vehicle width direction, the first linking member 24 and the second linking member 30 are disposed in an L shape, and a bent part in an intermediate part thereof is connected to the metal pipe 22.

In this arrangement, an axis L1 of the first linking member 24 extending in the fore-and-aft direction and an axis L2 of the second linking member 30 extending in a substantially vertical direction intersect an axis L3 of the metal pipe 22 extending in the vehicle width direction (see FIG. 2).

The operation of the first embodiment of the present invention having the above arrangement is now explained.

Since the steering hanger 21 connecting the left and right front pillar lowers 14 and 14 in the vehicle width direction is formed from the metal pipe 22 on the left side in the vehicle width direction and the CFRP pipe 23 on the right side in the vehicle width direction, and the steering column, which is not illustrated, is supported on the metal pipe 22, it is possible, while ensuring the strength with which the steering column is supported, to lighten the weight of the steering hanger 21 compared with a case in which the entire steering hanger 21 is formed from a metal.

Furthermore, since the metal pipe 22 is connected to the upper part of the dash panel lower 15 by means of the first linking member 24 made of a CFRP, and the metal pipe 22 is connected to the center tunnel 16 by means of the second linking member 30 made of a CFRP, that is, since the metal pipe 22 is connected to the intermediate part of the first and second linking members 24 and 30 made of a CFRP, it is possible, by transmitting, to the high strength center tunnel 16, via the first linking member 24 and the second linking member 30, the collision load of a frontal collision input from the front side frames 18 and 18 into the dash panel lower 15, to prevent the dash panel lower 15 from collapsing to the rear while minimizing any increase in the weight, and to enhance the stiffness of the intermediate part in the longitudinal direction of the steering hanger 21, which is a long member, thus preventing vibration of the steering column or a steering wheel.

Moreover, since the axis L1 of the first linking member 24 connecting the dash panel lower 15 and the metal pipe 22 and the axis L2 of the second linking member 30 connecting the center tunnel 16 and the metal pipe 22 intersect the axis L3 of the metal pipe 22, it is possible to efficiently transmit a rearward collision load input into the dash panel lower 15 to the center tunnel 16 via the first linking member 24, the metal pipe 22, and the second linking member 30. Furthermore, since the mounting seating face 34 of the lower portion 30a of the second linking member 30 is connected to the side wall 16a of the center tunnel 16, it is possible, by supporting the rearward collision load input into the steering hanger 21 due to a frontal collision with a shear load of the second linking member 30, to enhance the strength with which the steering hanger 21 is supported.

Furthermore, since the second linking member 30 is a closed cross-section member whose cross section reduces toward the lower portion 30a, it is possible to ensure a wide space for the feet of an occupant while achieving a balance between light weight and strength of the second linking member 30 and, moreover, since the bulkhead 36 is disposed within the lower portion 30a, it is possible, by supplementing the strength of the reduced cross section lower portion 30a by means of the bulkhead 36, to make the strength of each part of the second linking member 30 uniform. In particular, since the first linking member 24 and the second linking member 30 are formed so as to have a hollow closed cross-section by joining the pairs of first CFRP sheets 25, 26 and second CFRP sheets 31, 32 having a squared U-shaped cross section, and integrally includes the mounting seating faces 27, 29, 33, and 34 on opposite end parts, the first and second linking members 24 and 30 are lightweight and high strength members, and the strength with which the first and second linking members 24 and 30 are joined to the dash panel lower 15, the center tunnel 16, and the metal pipe 22 is enhanced.

The first embodiment of the present invention is explained above, but the present invention may be modified in a variety of ways as long as the modifications do not depart from the spirit and scope thereof.

For example, in the first embodiment the metal pipe 22 is disposed on the left side in the vehicle width direction and the CFRP pipe 23 is disposed on the right side in the vehicle width direction, but their positional relationship may be reversed.

Furthermore, in the first embodiment the first linking member 24 and the second linking member 30 are formed from separate members, but they may be linked integrally and formed from one member.

Moreover, in the first embodiment ridges and valleys of the corrugated core material 39 extend in the vehicle width direction, but the core material 39 may be disposed so that ridges and valleys extend in the fore-and-aft direction.

A second embodiment of the present invention is now explained by reference to FIG. 4 to FIG. 8.

Second Embodiment

In the second embodiment also, the fore-and-aft direction, the left-and-right direction (vehicle width direction), and the vertical direction are defined with reference to an occupant seated on a driving seat.

Figure 4:
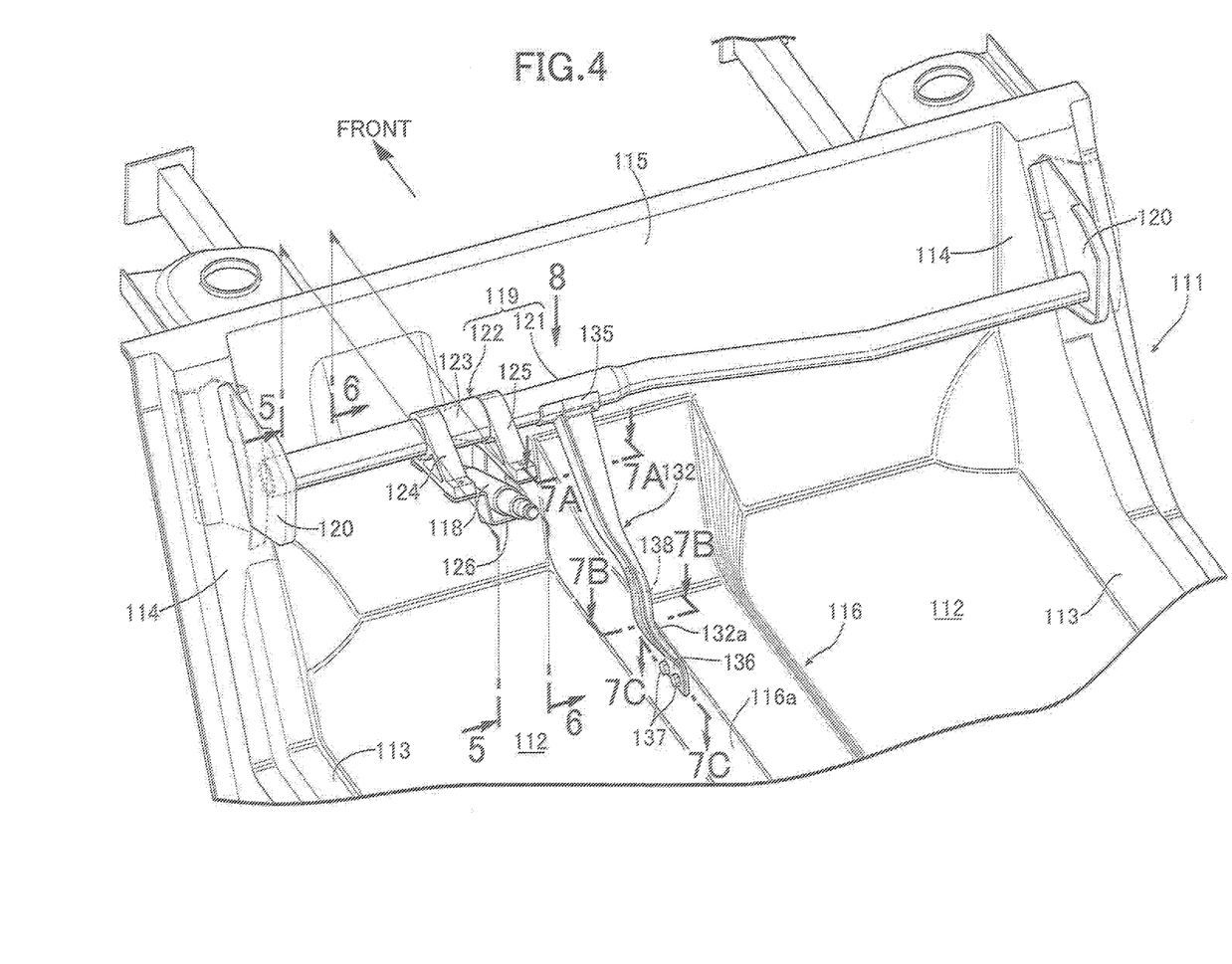
FIG. 4 is a perspective view of a front part of a vehicle body of an automobile. (second embodiment)

As shown in FIG. 4, a cabin 111 formed into a bathtub shape using a CFRP (carbon fiber-reinforced plastic) includes a pair of left and right side sills 113 and 113 extending in the fore-and-aft direction along left and right side parts of a floor panel 112, a pair of left and right front pillar lowers 114 and 114 rising from front ends of the left and right side sills 113 and 113, a dash panel lower 115 rising from the front end of the floor panel 112 and providing a connection between front ends of the left and right front pillar lowers 114 and 114, and a center tunnel 116 extending from a rear face of the dash panel lower 115 to the rear in a middle part in the vehicle width direction of the floor panel 112.

The structure of a steering hanger 119 supporting a steering column 118 is now explained by reference to FIG. 4 to FIG. 8.

The steering hanger 119 is formed from a steering hanger main body 121 formed from a CFRP pipe material having opposite ends in the vehicle width direction fixed to mounting brackets 120 and 120, pressed from a steel sheet, fixed to upper rear faces of the left and right front pillar lowers 114 and 114, and a steering column support part 122 provided on the steering hanger main body 121 and supporting the steering column 118. The steering column support part 122 is formed from an aluminum pipe material 123 fixed in a state in which it is fitted around the outer periphery of the steering hanger main body 121, and a first aluminum extrusion 124 and a second aluminum extrusion 125 fixed to opposite ends in the vehicle width direction of the aluminum pipe material 123.

The first aluminum extrusion 124 fixed to the left end of the aluminum pipe material 123 and the second aluminum extrusion 125 fixed to the right end of the aluminum pipe material 123 are members having a basically constant cross section in the vehicle width direction, but the two have slightly different shapes, the second aluminum extrusion 125 being larger in size than the first aluminum extrusion 124.

Figure 5:
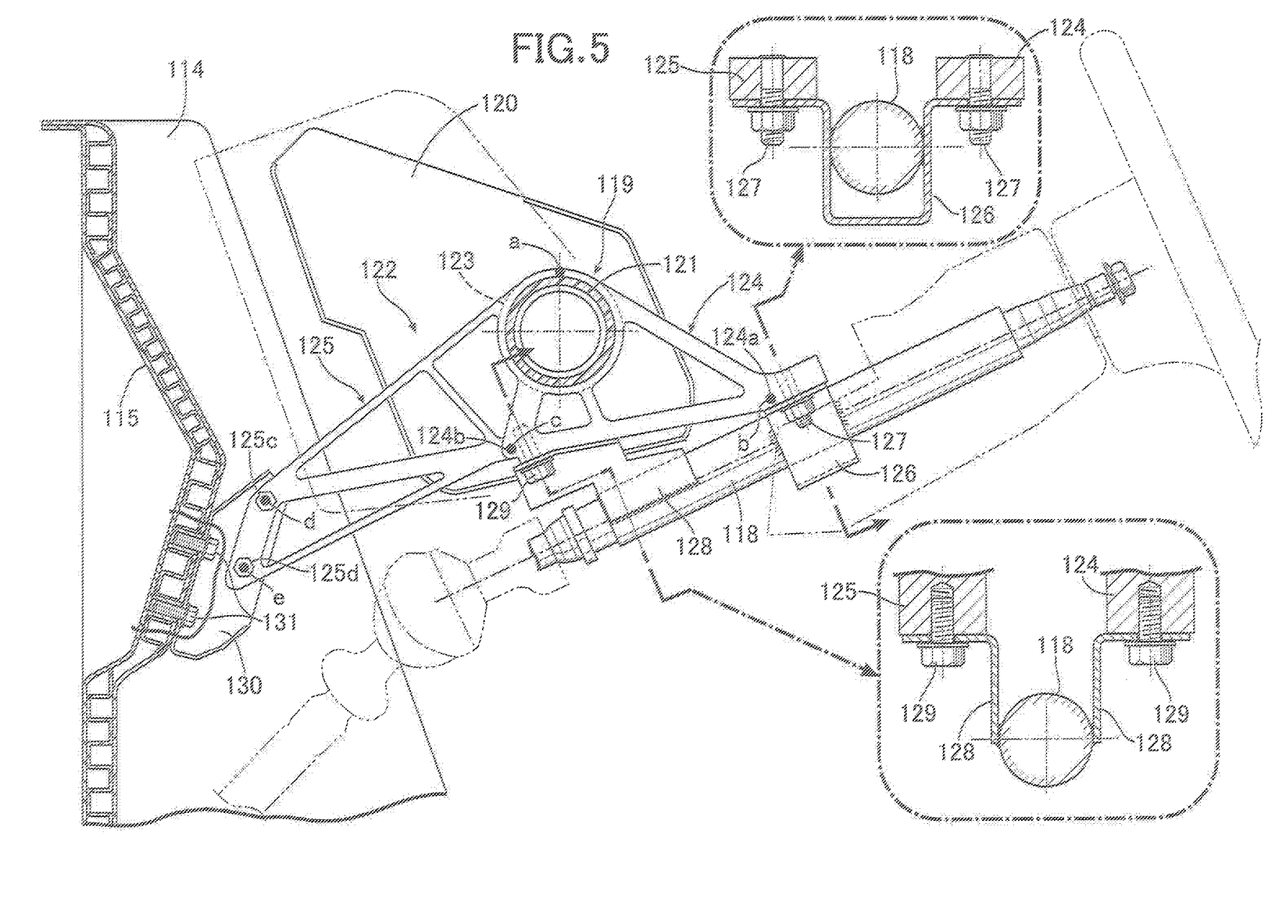
FIG. 5 is a sectional view along line 5-5 in FIG. 4. (second embodiment)

The first aluminum extrusion 124 is a member having a truss structure in which two triangles are combined when viewed in the vehicle width direction; the aluminum pipe material 123 is fixed to a position corresponding to a first apex a thereof, and first and second fixed portions 124a and 124b are provided at positions corresponding to a second apex b and a third apex c respectively (see FIG. 5). The second aluminum extrusion 125 is a member having a truss structure in which five triangles are combined when viewed in the vehicle width direction; the aluminum pipe material 123 is fixed to a position corresponding to a first apex a thereof, first and second fixed portions 125a and 125b are provided at positions corresponding to a second apex b and a third apex c respectively, and third fixed portions 125c and 125d are provided at positions corresponding to a fourth apex d and a fifth apex e respectively (see FIG. 6).

Figure 6:
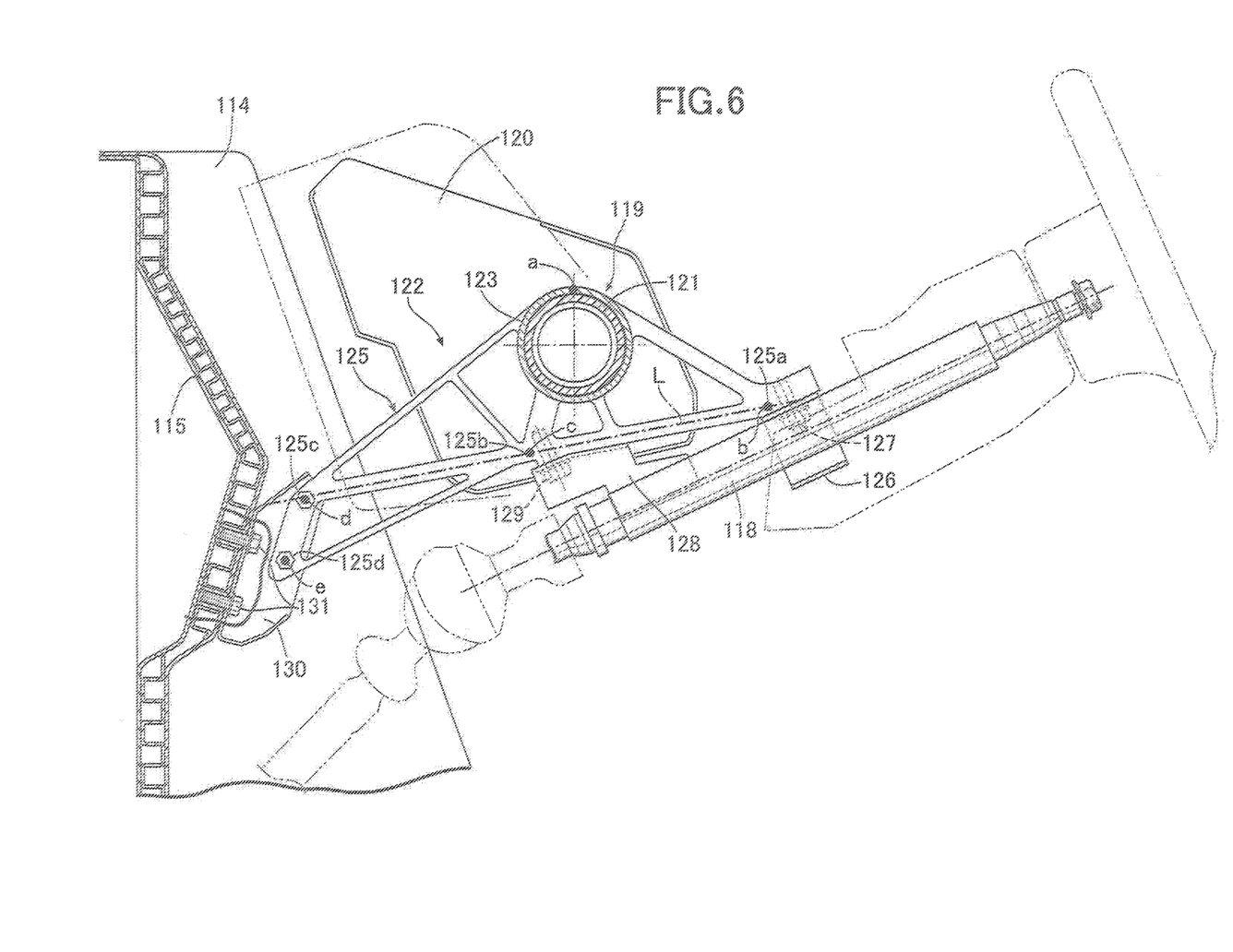
FIG. 6 is a sectional view along line 6-6 in FIG. 4. (second embodiment)

A mounting bracket 126 provided on a rear part of the steering column 118 is secured to the first fixed portions 124a and 125a of the first aluminum extrusion 124 and the second aluminum extrusion 125 via bolts 127 and 127, and a mounting bracket 128 provided on a front part of the steering column 118 is secured to the second fixed portions 124b and 125b of the first aluminum extrusion 124 and the second aluminum extrusion 125 via bolts 129 and 129, thus supporting the steering column 118 on the steering hanger main body 121.

Furthermore, the steering hanger main body 121 and the dash panel lower 115 are connected via the second aluminum extrusion 125 by securing a mounting bracket 130 fixed to the third fixed portions 125c and 125d of the second aluminum extrusion 125 to the rear face of the dash panel lower 115 via bolts 131 and 131.

A linking member 132 rising upward to the front from a left side wall 116a of the center tunnel 116, which has an inverted U-shaped cross section, is connected to a lower face of the steering hanger main body 121. With regard to the linking member 132, the cross section reduces from the upper end, which is connected to the steering hanger main body 121, toward the lower end, which is connected to the center tunnel 116, and it is formed so as to have a hollow closed cross-section by joining a first CFRP sheet 133 having a squared U-shaped cross section and a second CFRP sheet 134 having a squared U-shaped cross section (see FIG. 7 (A)), a partially cylindrical mounting seating face 135 formed integrally with the upper end being fixed to a lower face of the steering hanger main body 121 by bonding (see FIG. 8) and a mounting seating face 136 formed integrally with the lower end being fixed to the left side wall 116a of the center tunnel 116 via bolts 137 and 137 (see FIG. 4 and FIG. 7 (C)).

With regard to the linking member 132, the width in the vehicle width direction decreases toward the lower end, and the linking member 132 has a flat plate-shaped solid cross section at the mounting seating face 136. Disposed in a lower portion 132a of the linking member 132 connected to an upper part of the mounting seating face 136 is a bulkhead 138 that has a Z-shaped cross section and connects inner faces of the first CFRP sheet 133 and the second CFRP sheet 134 (see FIG. 4 and FIG. 7 (B)).

The operation of the second embodiment of the present invention having the above arrangement is now explained.

Since the steering hanger 119 supporting the steering column 118 is a long member having opposite end parts in the vehicle width direction supported on the left and right front pillar lowers 114 and 114 via the mounting brackets 120 and 120, it is susceptible to vibration; there is a possibility that the steering column 118 or a steering wheel supported thereon will vibrate to thus give an unpleasant sensation to a driver, and if, in order to prevent the vibration of the steering hanger 119, the entire steering hanger 119 is made of a high stiffness metal, there is the problem that the weight will increase greatly.

In accordance with this second embodiment, since only the steering hanger main body 121 is made of a CFRP, and the steering column support part 122 supporting the steering column 118 on the steering hanger main body 121 is formed from the aluminum pipe material 123 fitted around the outer periphery of the steering hanger main body 121 and the first and second aluminum extrusions 124 and 125 connecting the aluminum pipe material 123 to the steering column 118, compared with a case in which both the steering hanger main body 121 and the steering column support part 122 are made of a CFRP, although the weight increases slightly, vibration of the steering column 118 is suppressed due to the steering column support part 122 being made of high stiffness aluminum, and as a result it is possible to achieve a balance between lightening of the weight of the steering hanger 119 and prevention of vibration of the steering column 118.

Furthermore, since the steering hanger main body 121 and the center tunnel 116 of the floor panel 112 are connected via the CFRP linking member 132, it is possible by reinforcing the steering hanger main body 121 formed from a CFRP pipe material, which is susceptible to vibration, with the CFRP linking member 132 to suppress the occurrence of vibration while minimizing any increase in the weight.

Figure 7:
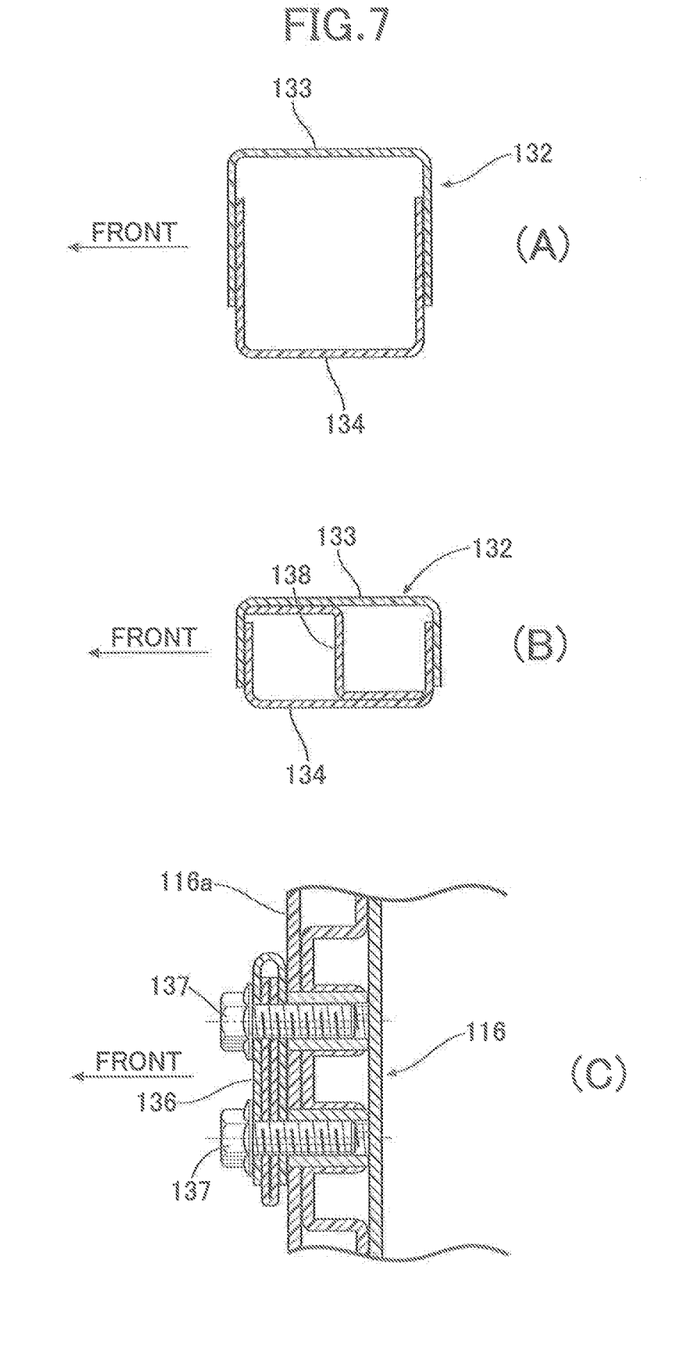
FIG. 7 is a sectional view along lines 7A-7A, 7B-7B, and 7C-7C in FIG. 4. (second embodiment)

In particular, since the linking member 132 is a closed cross-section member whose cross section reduces toward the lower portion 132a, which is connected to the center tunnel 116, it is possible to ensure a wide space for the feet of an occupant while achieving a balance between light weight and strength of the linking member 132, and since the bulkhead 138 is disposed within at least the lower portion 132a, it is possible, by supplementing the strength of the lower portion 132a having a reduced cross section with the bulkhead 138, to make the strength of each part of the linking member 132 uniform.

Furthermore, since the linking member 132 is formed so as to have a hollow closed cross-section by joining the first and second CFRP sheets 133 and 134 having a squared U-shaped cross section, and the first and second CFRP sheets 133 and 134 integrally include the mounting seating faces 136 overlapping each other as a solid plate in a part connected to the center tunnel 116 at the lower end, the linking member 132 is a lightweight and high strength member, and the strength with which it is joined to the center tunnel 116 can be enhanced.

Figure 8:
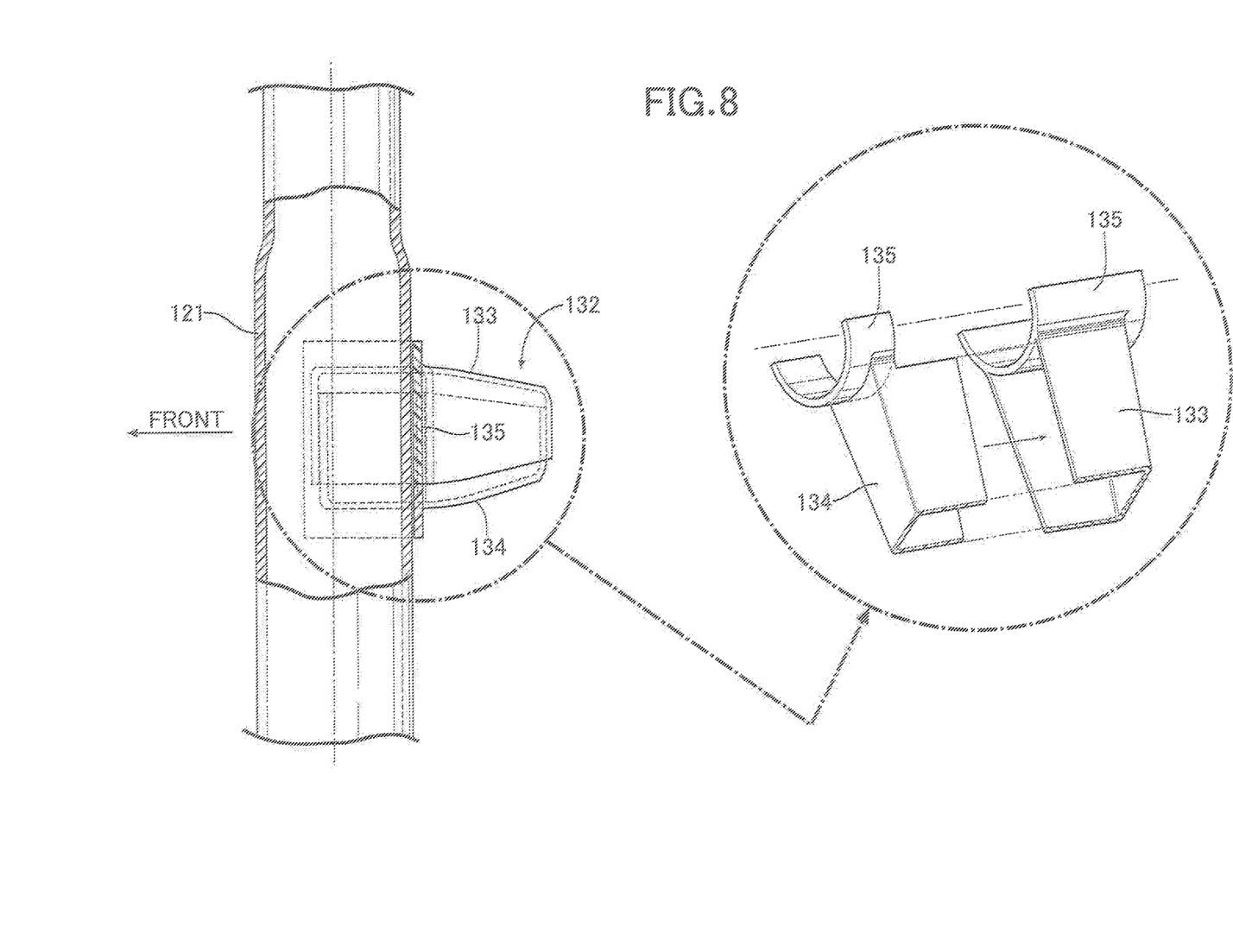
FIG. 8 is a view in the direction of arrow 8 in FIG. 4. (second embodiment)

Moreover, since the upper end of the linking member 132 is provided integrally with the mounting seating face 135 connected to the steering hanger main body 121, it is possible to enhance the strength with which it is joined to the steering hanger main body 121.

Furthermore, since the first and second aluminum extrusions 124 and 125 are members having a truss structure when viewed in the axial direction of the steering hanger main body 121, the aluminum pipe material 123 is connected to the first apex a of one triangle of the truss structure, and the first and second fixed portions 124a, 125a, 124b, 125b, to which the steering column 118 is fixed, are provided at the second apex b and the third apex c, the stiffness of the first and second aluminum extrusions 124 and 125 is enhanced, and the steering hanger main body 121 and the steering column 118 are strongly connected via the first and second aluminum extrusions 124 and 125, thus reducing vibration of the steering column 118 more effectively.

Moreover, since the second aluminum extrusion 125 includes the third fixed portions 125c and 125d fixed to the dash panel lower 115, and the first and second fixed portions 125a and 125b and the third fixed portion 125c on the upper side are disposed on a straight line L (see FIG. 6) extending in the fore-and-aft direction, the stiffness of the second aluminum extrusion 125 is enhanced, and the dash panel lower 115 and the steering column 118 are strongly connected via the second aluminum extrusion 125, thus reducing vibration of the steering column 118 more effectively.

The second embodiment of the present invention is explained above, but the present invention may be modified in a variety of ways as long as the modifications do not depart from the spirit and scope thereof.

For example, the steering column support part 122 of the second embodiment includes the first aluminum extrusion 124 and the second aluminum extrusion 125, but the number of aluminum extrusions does not need to be always two and may be one.

The invention claimed is:

1. An automobile vehicle body structure comprising:
   a steering hanger that is disposed in a vehicle width direction in a front part of a vehicle body of an automobile and supports a steering column,
   a center tunnel of a floor panel, and
   a linking member made of a carbon fiber-reinforced plastic (CFRP),
   wherein:
      the linking member connects the steering hanger and the center tunnel,
      the linking member is formed of a single pipe member having a closed cross-section section whose cross section reduces toward a lower portion thereof, and
      a bulkhead is disposed within the lower portion.

2. The automobile vehicle body structure according to claim 1, wherein the lower portion of the linking member is connected to a side wall of the center tunnel.

3. An automobile vehicle body structure comprising:
   a steering hanger that is disposed in a vehicle width direction in a front part of a vehicle body of an automobile and supports a steering column;
   a center tunnel of a floor panel; and
   a linking member made of a carbon fiber-reinforced plastic (CFRP),
   wherein:
      the linking member connects the steering hanger and the center tunnel,
      the linking member is a closed cross-section member whose cross section reduces toward a lower portion thereof,
      a bulkhead is disposed within the lower portion,
      the linking member is formed by joining a pair of CFRP sheets having a squared U-shaped cross section so as to have a hollow closed cross-section, and
      the pair of CFRP sheets integrally have mounting seating faces that overlap each other as a solid plate in a part connected to the center tunnel.

4. The automobile vehicle body structure according to claim 3, wherein the linking member integrally comprises another mounting seating face in a part connected to a steering hanger main body of the steering hanger.

5. The automobile vehicle body structure according to claim 3, wherein the steering hanger supporting the steering column comprises a steering hanger main body that is formed from a CFRP pipe material and a steering column support part that is provided on the steering hanger main body and supports the steering column, and the steering column support part comprises an aluminum pipe material that is fitted onto an outer periphery of the steering hanger main body and an aluminum extrusion that connects the aluminum pipe material to the steering column.

6. The automobile vehicle body structure according to claim 5, wherein the aluminum extrusion is a member having a truss structure when viewed in an axial direction of the steering hanger main body, the aluminum pipe material is connected to a first apex of one triangle of the truss structure, and first and second fixed portions are provided at a second apex and a third apex, the steering column being fixed to the first and second fixed portions.

7. The automobile vehicle body structure according to claim 6, wherein the aluminum extrusion comprises a third fixed portion fixed to a dash panel lower, and the first and second fixed portions and the third fixed portion are disposed on a straight line extending in a fore-and-aft direction.

8. An automobile vehicle body structure comprising:

a steering hanger that is disposed in a vehicle width direction in a front part of a vehicle body of an automobile and supports a steering column, and a center tunnel of a floor panel; and a linking member made of a carbon fiber-reinforced plastic (CFRP), wherein:

the linking member connects the steering hanger and the center tunnel, the linking member is a closed cross-section member whose cross section reduces toward a lower portion thereof, a bulkhead is disposed within the lower portion, the steering hanger is formed from a metal pipe on one side in the vehicle width direction and a CFRP pipe on the other side in the vehicle width direction, the steering column is supported on the metal pipe, and the metal pipe is connected to an intermediate part of a CFRP linking member connecting an upper part of a dash panel lower and the center tunnel.

9. The automobile vehicle body structure according to claim 8, wherein the linking member comprises a first linking member extending from the dash panel lower to the metal pipe and a second linking member extending from the metal pipe to the center tunnel, and axes of the first and second linking members intersect an axis of the metal pipe.

10. The automobile vehicle body structure according to claim 9, wherein the first and second linking members are formed by joining a pair of CFRP sheets having a squared U-shaped cross section so as to have a hollow closed cross-section, and integrally comprise a mounting seating face on opposite end parts thereof.

\* \* \* \* \*